United States Patent
Wang et al.

(10) Patent No.: US 8,644,050 B2
(45) Date of Patent: Feb. 4, 2014

(54) DATA RETENTION OF FERROELECTRIC FILMS BY CONTROLLING FILM COMPOSITION AND STRAIN GRADIENT FOR PROBE-BASED DEVICES

(75) Inventors: Li-Peng Wang, San Jose, CA (US); Qing Ma, San Jose, CA (US); Valluri Rao, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 265 days.

(21) Appl. No.: 12/420,717

(22) Filed: Apr. 8, 2009

(65) Prior Publication Data

US 2010/0260033 A1  Oct. 14, 2010

(51) Int. Cl.
*G11C 11/22* (2006.01)
(52) U.S. Cl.
USPC ......................................................... 365/145
(58) Field of Classification Search
USPC .......................................... 365/145; 369/126
See application file for complete search history.

(56) References Cited

U.S. PATENT DOCUMENTS 6,562,633 B2 *  5/2003  Misewich et al. .................. 438/3
2010/0195369 A1 *  8/2010  Zhao et al. ..................... 365/145

OTHER PUBLICATIONS

Misirlioglu et al., Misfit Dislocations in Nanoscale Ferroelectric Heterostructures, 2005, Applied Physics Letters, 86, pp. 192910-1 to 192910-3.*
Misfit dislocations in nanoscale ferroelectric heterostructures Appl. Phys. Lett. 86, 192910 (2005); DOI:10.1063/1.1922579 Published May 6, 2005.

* cited by examiner

*Primary Examiner* — Latanya Bibbins
(74) *Attorney, Agent, or Firm* — Blakely, Sokoloff, Taylor & Zafman LLP

(57) ABSTRACT

For a probe based data storage (PDS) device a ferroelectric film stack may be used as a media to store data bits by polarizing areas of the film as either an up domain or a down domain to represent bits. However a built-in-bias field (BBF) may create domain retention problems. By growing the ferroelectric films with stress and composition gradients this may generate polarization gradients which reduce the bias field. Thus, the retention (or imprint) may be improved with minimized BBF.

19 Claims, 3 Drawing Sheets

US 8,644,050 B2

DATA RETENTION OF FERROELECTRIC FILMS BY CONTROLLING FILM COMPOSITION AND STRAIN GRADIENT FOR PROBE-BASED DEVICES

FIELD OF THE INVENTION

Embodiments of the present invention are directed to erasable MEMS seek-scan probe (SSP) memories and, more particularly, to ferroelectric films used as storage mediums in such devices.

BACKGROUND INFORMATION

Conventional solid state memories employ microelectronic circuit elements for each memory bit. Since one or more electronic circuit elements are required for each memory bit (e.g., one to four transistors per bit), these devices can consume considerable chip "real estate" to store a bit of information, which limits the density of a memory chip. The primary memory element in these devices is typically a floating gate field effect transistor device that holds a charge on the gate of field effect transistor to store each memory bit. Typical memory applications include dynamic random access memory (DRAM), static random access memory (SRAM), erasable programmable read only memory (EPROM), and electrically erasable programmable read only memory (EEPROM).

A different type of solid state memory commonly known as a phase-change memory uses a phase-change material as the data storage mechanism and offers significant advantages in both cost and performance over conventional memories based on charge storage. Phase change memories use phase change materials—in other words, materials that can be electrically switched between two or more phases having different electrical characteristics such as resistance. One type of memory element, for example, uses a phase change material that can be electrically switched between a generally amorphous phase and a generally crystalline local order, or between different detectable phases of local order across the entire spectrum between completely amorphous and completely crystalline phases.

The phase-change memory can be written to, and read from, by applying current pulses that have the appropriate magnitude and duration and that cause the needed voltages across and current through the volume of phase-change material. A selected cell in a phase-change memory can be programmed into a selected state by raising a cell voltage and a cell current for the selected cell to programming threshold levels that are characteristic of the phase-change material. The voltage and current are then typically lowered to quiescent levels (e.g. essentially zero voltage and current) that are below the programming threshold levels of the phase-change material. This process can be performed by the application of, for example, a reset pulse and a set pulse which can program the cell into two different logic states. In both of these pulses, the cell voltage and cell current are caused to rise at least as high as certain threshold voltage and current levels needed to program the cell.

Next, to read the programmed cell, a read pulse can be applied to measure the relative resistance of the cell material, without changing its phase. Thus, the read pulse typically provides a much smaller magnitude of cell current and cell voltage than either the reset pulse or the set pulse.

These electrical memory devices typically do not use field effect transistor devices, but comprise, in the electrical context, a monolithic body of thin film material. As a result, very little chip real estate is required to store a bit of information, thereby providing for inherently high density memory chips. The phase change materials are also truly non-volatile in that, when set in either a crystalline, semi-crystalline, amorphous, or semi-amorphous phase representing a resistance value, that value is retained until reset as that value represents a physical phase of the material (e.g., crystalline or amorphous).

BRIEF DESCRIPTION OF THE DRAWINGS

The foregoing and a better understanding of the present invention may become apparent from the following detailed description of arrangements and example embodiments and the claims when read in connection with the accompanying drawings, all forming a part of the disclosure of this invention. While the foregoing and following written and illustrated disclosure focuses on disclosing arrangements and example embodiments of the invention, it should be clearly understood that the same is by way of illustration and example only and the invention is not limited thereto.

DETAILED DESCRIPTION

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Data storage devices based on scanning probe microscopy (SPM) techniques have been widely studied as future ultra-high density (>1 Tbit/in$^2$) systems. Ferroelectric thin films have been proposed as a promising recording media by controlling the spontaneous polarization directions corresponding to the data bits. The recording density could be ultra high because the thickness of 180° domain wall in ferroelectric material is in few lattices (1-2 nm). However, the domain stability, such as data retention and imprint, is a challenge for this material to be used in real products.

Experimentally, we have observed that there is an internal built-in-bias field (BBF) in as-grown ferroelectric thin films, such as PZT (Lead-Zirconate-Titanate). Experimentation and simulation show that the data retention (or imprint) of written nano-domains are degraded by the built-in-bias field (BBF). For example, when down polarization domains are written in PZT films with as-grown positive BBF (up polarization), the written down domains shrink in size, driven by the BBF. In addition, the shrinking rate increases with increasing BBF. This phenomenon presents the retention (or imprint) problem for the real world application. Embodiments described herein involve methods to minimize the BBF of as-grown PZT films by controlling the composition and strain gradient in the media film.

Figure 1:
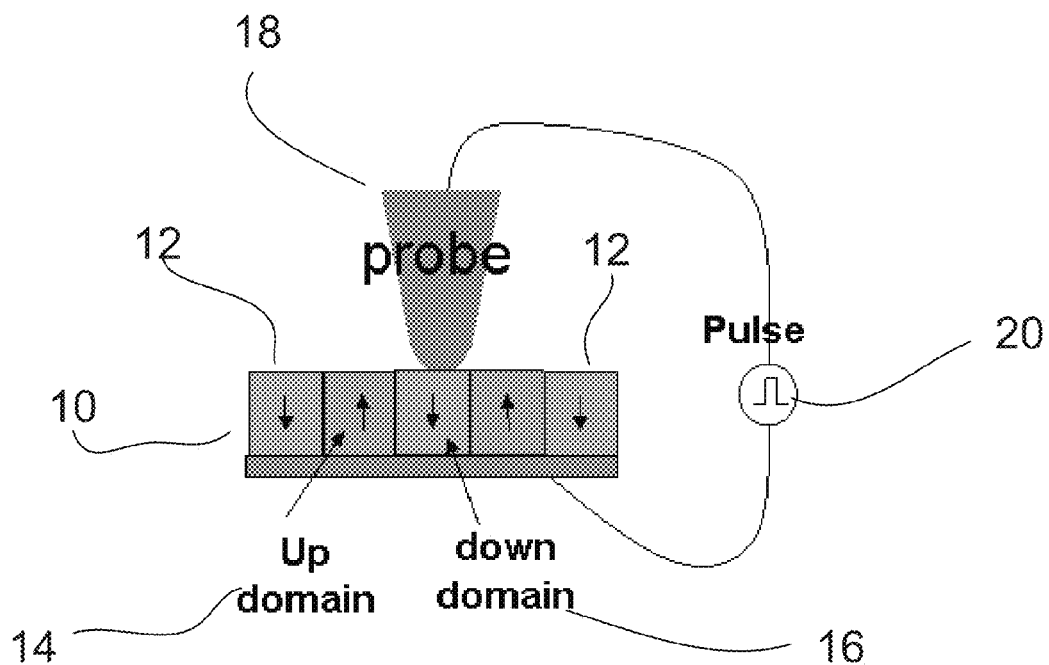
FIG. 1 is a simplified version of a probe based data storage (PDS) device.

Referring now to FIG. 1 there is shown a greatly simplified version of a probe based data storage (PDS) device. Ferroelectric thin films based on domain switching prove to be a promising media for PDS devices. Here, a ferroelectric film stack 10 may be used to store data bits 12 by polarizing areas of the film 10 as either an up domain 14 or a down domain 16. For example, an up domain 14 may represent a logical "1" and a down domain 16 may be used to represent a logical "0", or vice versa depending on the chosen convention. A probe 18 may polarize the domains with an electrical pulse 20 to write a bit in a write mode, or conversely, may be used to read a domain in a read mode.

Figure 2:
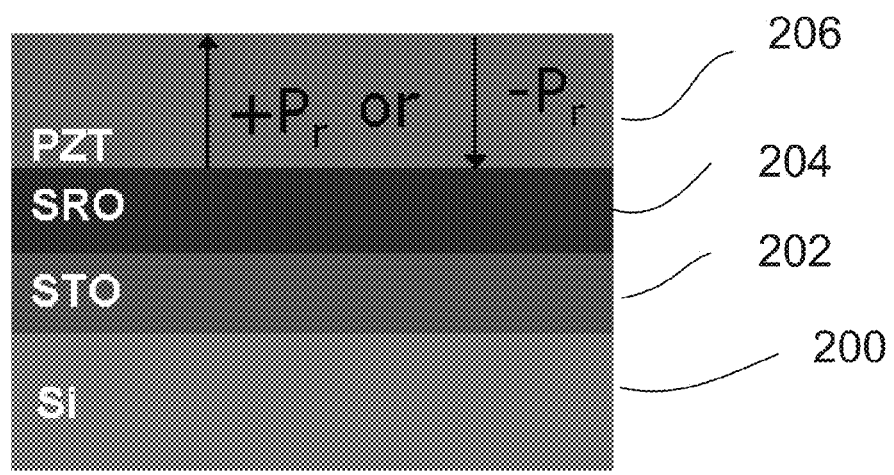
FIG. 2 is an example of a epitaxial ferroelectric stack.

FIG. 2 shows a typical epitaxial ferroelectric film stack which may be grown on an Si layer 200. As shown, the ferroelectric film may comprise several layers including an STO buffer layer 202, an SRO bottom electrode layer 204 as well as the PZT media layer 206. The STO buffer layer 202 may comprise $SrTiO_3$, the SRO bottom electrode layer 204 may comprise $SrRuO_3$ and the PZT media layer 206 may comprise for example PbZrTi.

Figure 3:
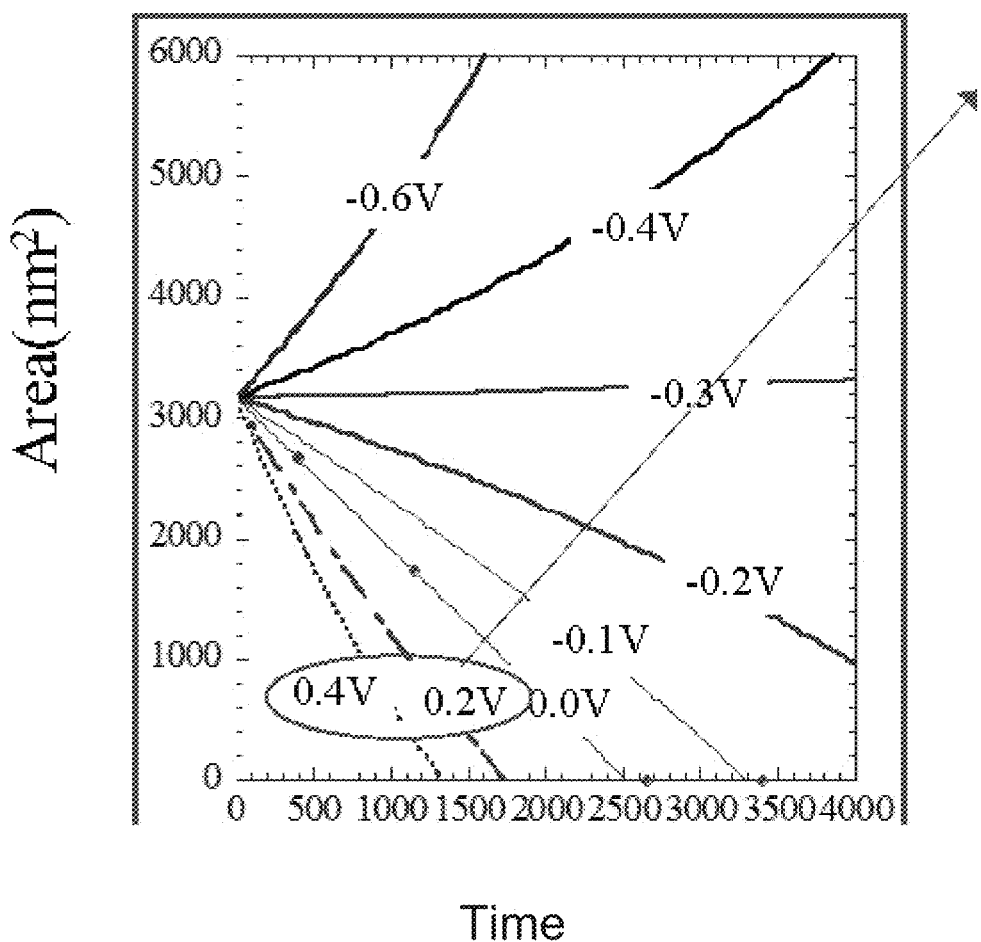
FIG. 3 is a diagram illustrating the data retention problem of written nano domain bits due to built-in-bias field (BBF)

FIG. 3 shows an experiment and simulation demonstrating that the data retention (or imprint) of written data domains are modulated by built-in-bias field (BBF). For example, for films with as-grown positive BBF (up polarization), the written domains with a down polarization will shrink faster when the BBF is larger. This phenomenon presents the retention or imprint problem for real world applications. Hence, according to embodiments, controlling the BBF to minimize the shrinking rate may significantly improve domain retention.

Figure 4:
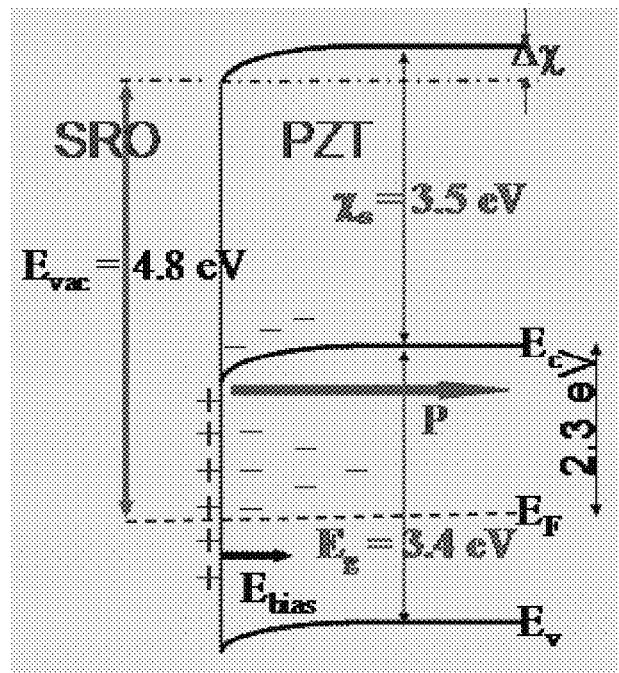
FIG. 4 is a band diagram showing the SRO/PZT interface inducing an internal field pointing from SRO to PZT.

FIG. 4 shows a band diagram showing the SRO/PZT interface has electrons. It leaves positive screening charges (holes) in the SRO side. This may induce the internal field pointing from the SRO bottom electrode 204 to the PZT ferroelectric media 206.

As far as the probable origins of BBF, experimentally it has been observed that there is a built-in-bias field (BBF) of the as-grown ferroelectric thin films, such as PZT. The origins of the BBF may be coming from a number of sources, for example from trapped charges at the interfaces or within the films. BBF may also come from aligned defect dipoles or from asymmetric electrodes (without top electrode) and therefore asymmetric electrical boundary conditions as shown in FIG. 4. Finally it may also be attributed to strain gradient due to epitaxial misfit, composition gradient, etc.

For the first two causes noted above, trapped charges and defect dipoles, they may be minimized by optimized ferroelectric film growth. However, for the asymmetric electrodes dues to asymmetric film stack of the device, this may not be resolved by optimizing the film growth process.

Figure 5:
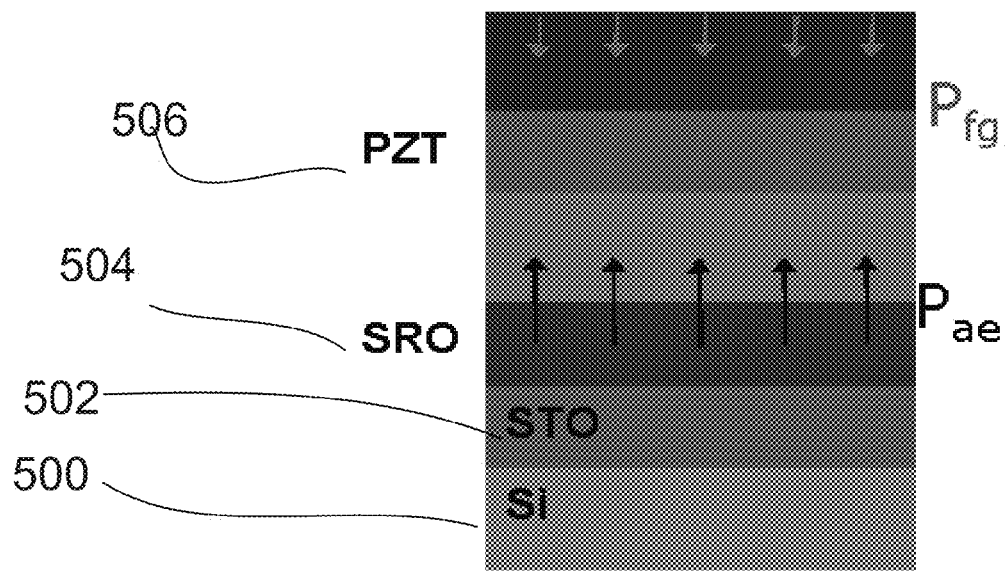
FIG. 5 is a is a ferroelectric stack having a composition and strain gradient to minimize the built-in-bias BBF and improve domain retention.

Embodiments of the invention comprise using composition or other gradients through the film thickness to compensate for bias field due to asymmetric electrodes. Referring to FIG. 5, this shows an epitaxial ferroelectric film stack which may be grown on an Si layer 500. As shown, the ferroelectric film may comprise several layers including an STO buffer layer 502, an SRO bottom electrode layer 504 as well as the PZT media layer 506. The STO buffer layer 502 may comprise $SrTiO_3$, the SRO bottom electrode layer 504 may comprise $SrRuO_3$ and the PZT media layer 506 may comprise for example PbZrTi or $PbZrTiO_3$ and may be varied from 200 nm to 12 nm thickness.

The PZT ferroelectric film layer 506 may comprise a composition gradient and/or strain gradient which may be used to create a polarization gradient. This has been discussed in, for example in Misirlioglu et al, Applied Physics Letters, 86, 192910 (2005) and in Journal Applied Physics, 76, 4305 (1994), both herein incorporated by reference. By growing the ferroelectric films with stress and composition gradients this generates polarization gradients ($P_{fg}$, internal field), which may cancel the bias field due to the asymmetric electrodes ($P_{ae}$). Thus, the retention (or imprint) may be improved with minimized BBF.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. An apparatus, comprising:
an assymetric electrode ferroelectric film stack storage medium to store data bits in the ferroelectric film stack by polarizing areas of the ferroelectric film stack storage medium as either an up domain or a down domain, the assymetric electrode ferroelectric film stack storage medium having a bias field due to the assymetric electrodes; and
a probe to write data bits to the ferroelectric film stack storage medium,
the ferroelectric film stack storage medium comprising a polarization gradient through the film stack that generates a bias field that compensates for the bias field due to the assymetric electrodes.

2. The apparatus as recited in claim 1 wherein the ferroelectric film stack storage medium comprises an STO buffer layer comprising $SrTiO_3$.

3. The apparatus as recited in claim 2 wherein the ferroelectric film stack storage medium further comprises an SRO bottom electrode layer comprising $SrRuO_3$.

4. The apparatus as recited in claim 3 wherein the film of the ferroelectric film stack storage medium is a PZT ferroelectric media layer comprising $PbZrTiO_3$ grown to have a composition gradient and a strain gradient that generates the polarization gradient.

5. The apparatus as recited in claim 3 wherein the SRO bottom electrode is asymmetric.

6. The apparatus as recited in claim 1, wherein the ferroelectric film stack storage medium comprises a composition gradient and a strain gradient to generate the polarization gradient.

7. A method, comprising:
fabricating an assymetric electrode ferroelectric film stack storage medium, the assymetric electrode ferroelectric film stack storage medium having a built-in bias field due to the assymetric electrodes, the asymmetric electrode ferroelectric film stack being fabricated with a polarization gradient through the film stack that generates a bias field; and
polarizing areas of a film of the ferroelectric film stack storage medium as either an up domain or a down domain to represent data bits using a probe;

wherein the bias field of the polarization gradient compensates the built-in-bias field.

8. The method as recited in claim 7, further comprising: fabricating the ferroelectric film stack storage medium with an STO buffer layer comprising $SrTiO_3$.

9. The method as recited in claim 8, further comprising: fabricating the ferroelectric film stack storage medium with an SRO bottom electrode layer comprising $SrRuO_3$.

10. The method as recited in claim 9 wherein the film of the ferroelectric film stack storage medium is a PZT ferroelectric media layer comprising $PbZrTiO_3$ grown to have a composition gradient and a strain gradient that generates the polarization gradient.

11. The method as recited in claim 9 wherein the SRO bottom electrode layer is asymmetric.

12. The method as recited in claim 7 wherein the probe writes the data bits to the ferroelectric film stack storage medium in a write mode.

13. The method as recited in claim 7 wherein the probe reads the data bits on the ferroelectric film stack storage medium in a read mode.

14. The method as recited in claim 7 wherein fabricating comprises fabricating the ferroelectric film stack storage medium with a composition gradient and a strain gradient to generate the polarization gradient.

15. A probe based data storage (PDS) device, comprising:
an assymetric electrode ferroelectric film stack to be used as a storage medium, the assymetric electrode ferroelectric film stack storage medium having a built-in bias field due to the assymetric electrodes; and
a probe to polarize areas of a film of the ferroelectric film stack as either an up domain or a down domain to write data bits in a write mode and to detect the up domain or down domain in a read mode;
wherein the ferroelectric film stack comprises a polarization gradient through the film stack that generates a bias field sufficient to compensate the built-in-bias field.

16. A probe based data storage (PDS) device as recited in claim 15, wherein the ferroelectric film stack comprises an STO buffer layer comprising $SrTiO_3$.

17. A probe based data storage (PDS) device as recited in claim 16, wherein the ferroelectric film stack further comprises an SRO bottom electrode layer comprising $SrRuO_3$.

18. A probe based data storage (PDS) device as recited in claim 17, wherein the film of the ferroelectric film stack is a PZT ferroelectric media layer comprising $PbZrTiO_3$ grown to have a composition gradient and a strain gradient to generate the polarization gradient.

19. A probe based data storage (PDS) device as recited in claim 17, wherein the SRO bottom electrode is asymmetric.

* * * * *